United States Patent [19]

Ishiguro et al.

[11] Patent Number: 5,035,484
[45] Date of Patent: Jul. 30, 1991

[54] METHOD AND APPARATUS FOR PRODUCING COATED OPTICAL FIBER

[75] Inventors: Yoichi Ishiguro; Masaharu Ooe; Kohei Kobayashi; Gotaro Tanaka; Minoru Watanabe, all of Yokohama, Japan

[73] Assignee: Sumitomo Electric Industries, Ltd., Osaka, Japan

[21] Appl. No.: 452,823

[22] Filed: Dec. 21, 1989

[30] Foreign Application Priority Data

Dec. 21, 1988 [JP] Japan .................. 63-322539
Dec. 27, 1988 [JP] Japan .................. 63-330470
Jul. 5, 1989 [JP] Japan .................. 64-173327
Nov. 10, 1989 [JP] Japan .................. 293026

[51] Int. Cl.⁵ .............. G02B 6/10; G02B 6/00; B05D 5/12; B21C 37/00
[52] U.S. Cl. .................... 350/96.30; 427/60; 428/608; 501/88; 501/95; 350/96.34
[58] Field of Search ............ 350/96.30–96.34; 427/39, 60, 64, 68; 501/88, 95; 428/608, 614

[56] References Cited

U.S. PATENT DOCUMENTS 4,737,379 4/1988 Hudgens et al. ............... 427/39
4,964,694 10/1990 Oohashi et al. ............ 350/96.34 X

FOREIGN PATENT DOCUMENTS 0095729 12/1983 European Pat. Off. .
0163457 12/1985 European Pat. Off. .
0222960 5/1987 European Pat. Off. .
0308143 3/1989 European Pat. Off. .
1646924 6/1970 Fed. Rep. of Germany .

Primary Examiner—Akm Ullah
Attorney, Agent, or Firm—Cushman, Darby & Cushman

[57] ABSTRACT

A surface of an optical fiber is coated by a method for coating a surface of an optical fiber with carbon comprising steps of introducing an optical fiber in a reaction chamber containing a coating raw material comprising carbon, hydrogen and halogen atoms and depositing on the surface of the optical fiber a carbon layer formed from the raw material by chemical vapor deposition, whereby the coated optical fiber has improved initial tensile strength and absorbs less hydrogen.

2 Claims, 8 Drawing Sheets

METHOD AND APPARATUS FOR PRODUCING COATED OPTICAL FIBER

BACKGROUND OF THE INVENTION

1. Field of the Invention

The present invention relates to a method and an apparatus for producing a coated optical fiber, and more particularly it relates to a method for producing an optical fiber which has improve strength and suffers less decrease of strength for a long time and no increase of light absorption due to hydrogen molecules, and an apparatus for producing an optical fiber coated with pyrolytic carbon by chemical vapor deposition (CVD).

2. Description of the Related Art

In some optical communication systems, an optical fiber having a length of 1 km or longer is required. In such case, one of problems is insufficient strength of the optical fiber. When the optical fiber is used, for example, as a wave guide in an undersea cable, the optical fiber is required to have a tensile strength of at least 200,000 psi. However, commercially available optical fibers have tensile strength in a range between 50,000 and 80,000 psi.

If a quartz optical fiber were made by drawing a preform under ideal conditions, it could have a tensile strength in the order of a hundred million psi. However, actually, the long optical fibers do not have such high mechanical strength. One of the reasons for the smaller mechanical strength of the commercial optical fibers is that submicron order flaws are formed on the surface of optical fiber by mechanical friction or chemical attack with impurities such as moisture in an atmosphere during and after drawing. That is, the optical fiber having no flaws may have the tensile strength in the order of a hundred million.

To overcome the above problem, the conventional optical fiber is coated with an organic coating material. The organic coating material cannot prevent diffusion of water vapor or hydroxyl ions in the optical fiber. Therefore, minute flaws can be formed on the surface of the optical fiber glass due to water vapor or the hydroxyl ions during use or storage, so that the strength of the optical fiber is decreased. In addition, the OH ions increase the transmission loss of the optical fiber. Accordingly, the optical fiber should be coated with a hermetic coating to prevent minute flaws on the surface.

Hitherto, the hermetic coating is formed from silicones or an inorganic material such as metals, and the chemical vapor deposition (CVD) is one of the most attractive methods. In the CVD method, a coating material is supplied as a raw material gas and forms a coating layer on the surface of the optical fiber. That is, one or more raw material gases are reacted at a certain temperature and deposited on the optical fiber surface.

By the CVD method, various kinds of coatings can be formed on the optical fiber surface, for example, silicon nitride, silicon, phosphosilicate glass, tin oxide, silicon oxynitride, boron, boron nitride and the like. It is also possible to form a coating of polycrystal of aluminum or tin on the optical fiber surface by the CVD method. Since the coating is formed homogeneously around the optical fiber by the CVD method, the optical fiber can be protected with the very thin coating. Thereby, light transmission loss due to microbends can be prevented.

FIG. 1 shows an apparatus for coating the optical fiber by the CVD method which is disclosed in Japanese Patent Publication No. 25381/1985. This apparatus 11 comprises a first isolation chamber 12, a reaction chamber 13 and a second isolation chamber 14. The first isolation chamber 12 and the reaction chamber 13 are connected with a small-diameter opening 16, and the reaction chamber 13 and the second chamber 14 are connected with a small-diameter opening 17. The first isolation chamber 12 and the second isolation chamber 14 have small-diameter openings 15 and 18, respectively. An optical fiber 10 is introduced in the apparatus 11 from the opening 15, passed through the first isolation chamber 12, the reaction chamber 13 and the second isolation chamber 14, and drawn out from the opening 18. During passing the reaction chamber 13, a coating is formed on the surface of the optical fiber 10 through chemical reactions. The first and second isolation chambers 12 and 14 are connected to the reaction chamber 13 to isolate the reaction chamber 13 from the ambient atmosphere. In the isolation chambers 12 and 14, inert gas is introduced through gas inlets 19 and 20, respectively, and internal pressure in the isolation chambers 12 and 14 are kept higher than the atmospheric pressure to prevent approach of the atmospheric air through the openings 15 and 28. The raw material gas is introduced in the reaction chamber 13 through an inlet 21 and the reacted gas is exhausted through an outlet 22. The raw material gas in the reaction chamber 13 is kept at a desired temperature with a heating coil 23.

As described above, the raw material gas is subjected to a chemical reaction and deposited on the surface of the optical fiber 10 to form the coating. The reaction proceeds on the optical fiber surface or in the gas phase, and the reaction product is deposited on the optical fiber surface. The raw material gas may be activated by applying energy through photochemical excitation with microwaves or radiofrequency plasma.

To increase a reaction rate or reaction efficiency in the CVD method, the raw material gas can be preheated before being introduced in the reaction chamber. In such case, the temperature of the optical fiber is kept higher than that of the raw material gas, whereby the deposition of the reaction product on the chamber wall is prevented. To this end, the optical fiber is introduced in the reaction chamber just after it is drawn and still kept at a considerably high temperature. Alternatively, the optical fiber in the reaction chamber is selectively heated by the application of IR light or a laser beam. FIG. 2 shows such heating apparatus for selectively heating the optical fiber, which is disclosed in Japanese Patent Publication No. 32270/1986.

The apparatus 2 of FIG. 2 comprises a pair of elongate heating sources 31 which are installed in a housing 33 in parallel in the progressing direction of the optical fiber and irradiate radiations such as IR light for heating the optical fiber 10, and a pair of reflective mirrors 32 each of which is combined with one of the heating source 31 and has an ellipsoidal cross section. Each of the elongate heating sources 31 is placed at one of focuses of the ellipsoidal cross section, and the optical fiber passes the other focus of the ellipsoidal cross section. The radiation irradiated from the heating sources 31 is reflected on the reflective mirrors 31 and passes a transparent window 34 and heats the optical fiber 10. The housing 33 contains many cooling water conduits 35, through which a cooling medium is circulated to cool the atmosphere near the mirror 32 in the housing 33.

However, in the conventional CVD methods, the reaction products react with the surface of the uncoated optical fiber and cause minute flaws on the surface, whereby minute cracks are formed in the uncoated fiber so that the initial strength of the optical fiber is decreased.

To overcome such defects of the CVD methods, Japanese Patent Publication No. 32270/1986 proposes a heterogeneous nucleation thermochemical deposition (HNTD), in which, on the surface of the heated bare optical fiber, fine particles of materials such as metals, glass and ceramics are directly formed. It is said that, since there were no or little reaction between the solid particles and the bare optical fiber surface in the HNTD method, the optical fiber surface would be less damaged than the CVD method.

A method for forming a hermetic coating of carbon on the optical fiber surface is disclosed by Japanese Patent Publication No. 10363/1963. This method is schematically shown in FIG. 3. In this method, a silica fiber preform 10' is heated and melt with a gas burner oxyhydrogen flame 41 made by a heating ring 40 which surrounds the preform 10'. Then, the preform is drawn under tension so as to decrease its diameter to form the optical fiber. Just below the heating ring 40, a cylinder 42 is provided, with which a carbon-containing gas is supplied in the direction indicated by arrows. Thereby, a thin carbon film is formed on the surface of the optical fiber.

EP-A-0 308 143 discloses a method for coating carbon on the optical fiber which comprises drawing a glass rod to decrease its diameter to form a bare optical fiber, introducing the optical fiber kept at high temperature in a carbonaceous atmosphere to coat the optical fiber with carbon.

The reason why carbon is selected as the material of the hermetic coating is that the carbon film is formed at a higher rate than other materials, and prevents transmission of hydrogen ($H_2$), and deterioration of optical fiber strength.

Although the hermetic carbon coating improves the long term strength of the optical fiber, it decreases the initial strength of the optical fiber.

The above European Patent Application proposes the addition of chlorine gas to the raw material gas. However the addition of chlorine gas deteriorates the ability of hermetic carbon coating for preventing the transmission of hydrogen (hydrogen resistance) and, in an extreme case, the coated optical fiber has the same hydrogen resistance as a bare optical fiber.

SUMMARY OF THE INVENTION

One object of the present invention is to provide a method for coating an optical fiber with carbon, by which a carbon coating is formed on the optical fiber surface without deteriorating mechanical strength, particularly initial strength of the optical fiber.

Another object of the present invention is to provide an optical fiber a surface of which is coated with a carbon layer.

A further object of the present invention is to provide an apparatus for coating an optical fiber, by which a temperature of the optical fiber introduced in a reaction chamber for coating the optical fiber is effectively kept at a desired temperature.

According to a first aspect of the present invention, there is provided a method for coating a surface of an optical fiber with carbon comprising steps of:

introducing an optical fiber in a reaction chamber containing a coating raw material comprising carbon, hydrogen and halogen atoms preferably in such atomic numbers that the number of halogen atoms is smaller than that of hydrogen atoms and depositing, on the surface of the optical fiber, a carbon layer formed from said raw material by chemical vapor deposition.

According to a second aspect of the present invention, there is provided an optical fiber a surface of which is coated with a carbon layer wherein the carbon atoms in the carbon layer and silicon oxide of the optical fiber are not chemically bonded with one another.

According to a third aspect of the present invention, there is provided a method for coating a surface of an optical fiber comprising steps of:

introducing an optical fiber, which has been fabricated by melting and drawing a glass preform for an optical fiber, in a reaction chamber in which a raw material comprising carbon, hydrogen and halogen atoms is introduced and depositing pyrolytic carbon formed from said hydrocarbon or its derivative by chemical vapor deposition on a surface of the optical fiber, wherein the optical fiber introduced in the reaction chamber is kept at a temperature in the range between 700° C. and 1400° C.

According to a fourth aspect of the present invention, there is provided an apparatus for coating an optical fiber with pyrolytic carbon formed from a raw material comprising carbon, hydrogen and halogen atoms by chemical vapor deposition which apparatus comprises a reaction chamber in which the pyrolytic carbon is deposited on a surface of the optical fiber and means for adjusting a temperature of the optical fiber which is introduced in the reaction chamber in the range between 700° C. and 1400° C.

DETAILED DESCRIPTION OF THE DRAWINGS

Figure 1:
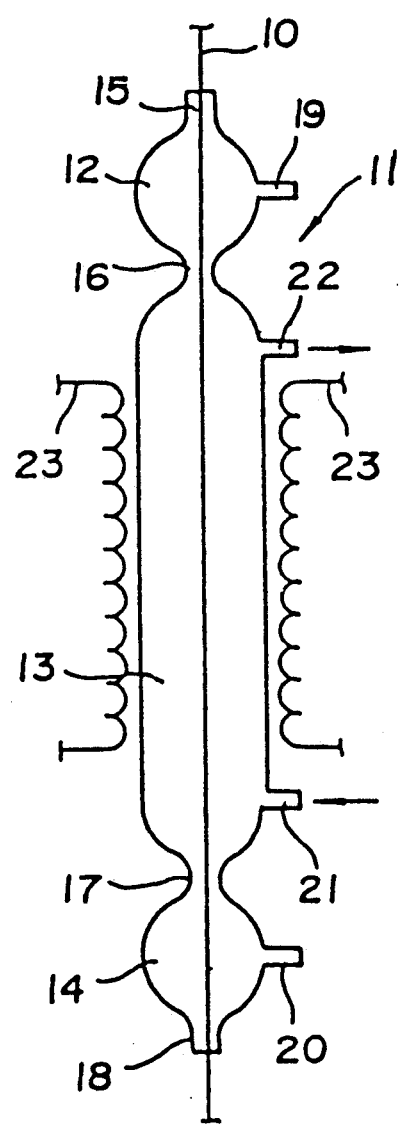
FIG. 1 schematically shows an apparatus for forming a coating on a surface of an optical fiber by the CVD method.
Figure 2:
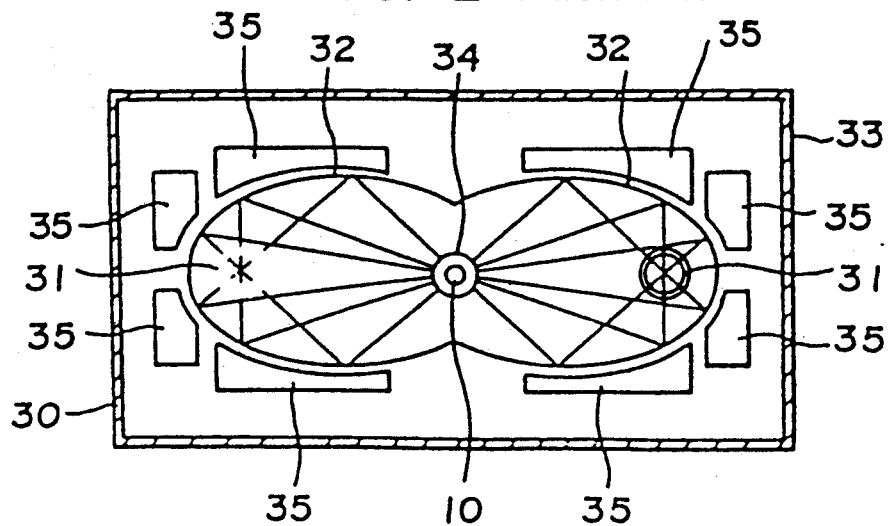
FIG. 2 is a cross section of an apparatus for heating the optical fiber in the reaction chamber, FIG. 3 schematically shows an apparatus for forming a hermetic coating on a surface of an optical fiber, FIG. 4 schematically shows one embodiment of the apparatus for carrying out the process for coating an optical fiber according to the present invention, FIG. 5 schematically shows another embodiment of the apparatus for carrying out the process for coating an optical fiber according to the present invention, FIG. 6 schematically shows one embodiment of the apparatus of the present invention for coating an optical fiber, FIG. 7 schematically shows another embodiment of the apparatus of the present invention for coating an optical fiber, FIG. 8 schematically shows a further embodiment of the apparatus of the present invention for coating an optical fiber, and FIG. 9 are graphs showing the relationships between the properties of the coated optical fibers produced in Example 1 and the H/Cl atomic ratio.
Figure 3:
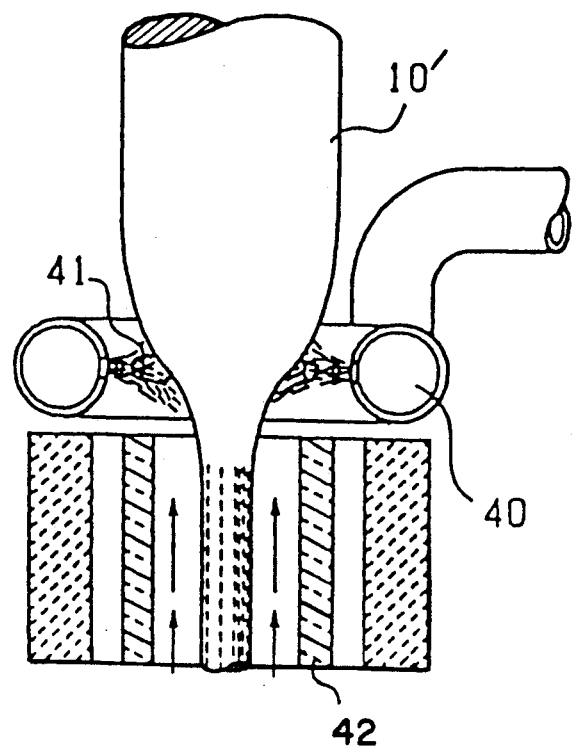

As the result of extensive studies to provide a hermetic carbon coating with good performances on the optical fiber, it has been found that the hydrogen permeability through the carbon coating depends on the atomic ratio of hydrogen to halogen (H/halogen) in the raw material gas and types and the number of unsaturated bonds in the carbon source. When the H/halogen atomic ratio is one or larger, most of the halogen atoms in the raw material are consumed to form hydrogen halogenide such as hydrogen chloride. Therefore, the number of the halogen atoms remaining in the carbon coating is decreased so that the carbon coating becomes dense and in turn the hydrogen permeability through the carbon coating is decreased.

As the raw material, hydrocarbons, hydrogen, halogenated hydrocarbons, halogens, halogenated carbons and mixtures thereof are used.

To increase the deposition rate of carbon with keeping the low hydrogen permeability, the following measures are preferably employed:

First, a raw material which inherently achieves a high deposition rate is selected. Examples of such raw material are hydrocarbons such as methane, ethane, propane, ethylene, propylene, acetylene, benzene and mixtures thereof. Among them, ethylene is preferred since its reaction rate is high. As the halogen source, compounds comprising chlorine atom(s) such as chlorine gas ($Cl_2$), carbon tetrachloride, hexachloroethane, trichloroethane, tetrachloroethane, pentachloroethane, hexachloropropane, etc. are preferably used, although other halogenated hydrocarbons such as $CBr_4$, $CF_4$, $CClF_3$, $CBrF_3$, $C_2ClF_5$, $C_2F_6$, $C_3F_8$, etc. can be used. Among them, carbon tetrachloride is more preferred since the content of chlorine atoms is larger in carbon tetrachloride than other chlorinated hydrocarbons. In addition, carbon tetrachloride contains one carbon atom per molecule, its reaction rate is high and it increases the deposition rate of carbon. Further, carbon tetrachloride is less corrosive than the chlorine gas ($Cl_2$)

To form the dense carbon coating at a high deposition rate, the temperature of the bare optical fiber is controlled in the range between 700° C. and 1400° C., preferably in the range of 900° C. to 1300° C. When said temperature exceeds 1400° C., SiC fine particles tend to form through the reaction between $SiO_2$ and carbon and SiC decreases the initial strength of the optical fiber. When said temperature is lower than 700° C., the coating has a composition like an organic material having larger resistivity since a plenty amount of hydrogen atoms remain in the coating. Therefore, the hydrogen molecules pass through the coating and reach the optical fiber glass. To decrease the transmission of hydrogen molecules to substantially zero, the pyrolytic carbon coating which is formed at a temperature higher than 700° C. and has resistivity of $8 \times 10^{-3}$ ohm.cm or less is preferable.

To prevent or suppress the boding between the carbon coating and the optical fiber surface, it is preferred not to use an active compound which reacts with the bare optical fiber, namely $SiO_2$. To this end, a compound having less unsaturation is preferred. However, a compound having no unsaturate bond has a low reaction rate and cannot provide a coating having an enough thickness. Therefore, a compound having a double bond is more preferred than one having a triple bond. For example, when ethylene is used as the hydrocarbon, the decrease of initial strength of the optical fiber is effectively prevented.

In the raw material, an inert gas which will not adversely affect the decomposition of the raw material (e.g. helium and argon) may be contained.

To proceed the reaction more effectively, the raw material should be supplied to the reaction chamber in good conditions. When the reaction chamber has a too small diameter, carbon soot is deposited on a surface of an inner wall of the chamber so that a long optical fiber cannot be coated with carbon with good quality. When the reaction chamber has a too large diameter, the raw material does not flow in good condition. Therefore, the diameter of the reaction chamber is at least 2.5 cm and preferably not larger than about 4 cm.

The temperature of the reaction chamber in which the hydrocarbon is pyrolyzed and deposited on the optical fiber varies with the kind of hydrocarbon. For example, in case of a mixture of methane and carbon tetrachloride, it is from 500° C. to 600° C.

When a linear velocity of the optical fiber in the reaction chamber is too large, it is difficult to maintain a concentration of the raw material in the chamber in a preferred range. Then, the linear velocity of the optical fiber is preferably from 2.0 to 3.5 m/sec.

In a preferred embodiment of the process of the present invention, the optical fiber which has been drawn from a glass preform in a drawing fiber is introduced in the reaction chamber under conditions which satisfy the following equation:

$$0.035 \text{ m/min.} < R \times v/L \leq 0.075 \text{ m/min.} \tag{I}$$

wherein L is a distance from a neck-down part of the glass preform to the reaction chamber, R is an outer diameter of the bare optical fiber and v is a velocity of the optical fiber. When the above conditions are met, the optical fiber which reaches the reaction chamber is always kept at a temperature in the range between 700° C. and 1400° C.

The raw material gas is preferably flowed downwardly in the reaction chamber, namely in the same direction as the optical fiber passes in the reaction chamber. By flowing the raw material gas in the same direction as the optical fiber passes, the decrease of initial strength of the optical fiber is more effectively prevented. This is because the bare optical fiber kept at high temperature is contacted with the hydrocarbon gas just after introduced in the reaction chamber which hydrocarbon gas does not contain any impurities harmful to the optical fiber glass such as soot, and the hydrocarbon is pyrolyzed directly on the optical fiber glass and deposited thereon. Therefore, the coating is formed on the optical fiber surface without causing flaws on the optical fiber surface with the impurities.

The bare optical fiber to be coated with the carbon coating is preferably an optical fiber which is freshly drawn from a glass preform for the optical fiber, although, it may be one previously fabricated and wound insofar as it is not coated with a resin coating.

In the present invention, not only an optical fiber consisting of pure silica ($SiO_2$) but also one consisting of silica which contains an additive for adjusting a refractive index of glass such as fluorine can be coated.

After the formation of the pyrolytic carbon coating and preferably the coated optical fiber is cooled, a resin coating is applied around the carbon coating. With the application of the resin coating, handling of the optical fiber is improved, and effects of coatings are improved.

Examples of the resin to be coated are silicones, polyurethane acrylate, etc.

The resin coating is formed generally at a fiber temperature of 100° C. or lower. When a thermosetting resin is used, it may be cured in a die if the fiber temperature is too high. To satisfy the above condition (I), the lineal speed of the optical fiber is considerably high. Therefore, to cool the pyrolytic carbon coated fiber to a temperature suitable for resin coating, the distance between the reaction chamber and the resin coating apparatus should be made large, which makes the overall height of the apparatus very high. Then, it is preferred to decreased the fiber temperature by forced cooling before resin coating.

Figure 4:
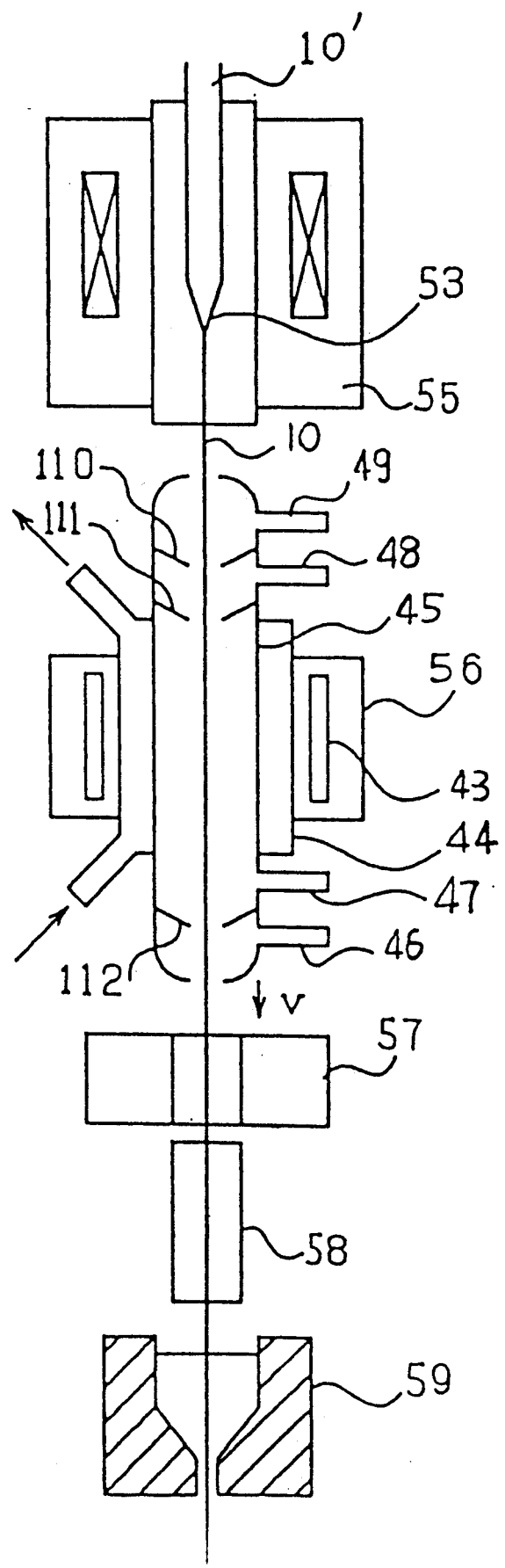

FIG. 4 schematically shows one apparatus for carrying out the process for depositing the pyrolytic carbon on the optical fiber according to the present invention.

In the apparatus of FIG. 4, a glass preform 10' for optical fiber fabrication is melt and drawn in a drawing furnace 55 having a conventional heat source which does not generate hydrogen or dust such as an electric furnace, a radiofrequency furnace and the like to fabricate a bare optical fiber 10. The surface of the bare optical fiber 10 is coated with pyrolytic carbon with a reaction furnace 56. The outer diameter of the carbon coated optical fiber is measured with laser measuring means 57 so that the drawing rate or other conditions are controlled to adjust the outer diameter of the carbon coated optical fiber. After passing the laser measuring means 57, the optical fiber is cooled with a cooling device 58 and coated with a resin with a die 59.

The reaction furnace 56 is preferably a furnace which can concentrically heat the bare optical fiber 10 such as an IR concentration heater so as to suppress undesirable reactions which proceed at a place other than the optical fiber surface. In this embodiment, the reaction furnace 56 comprises a reaction tube 45 surrounded by a cooling jacket 44 made of quartz which is further surrounded with an IR lamp 43 for concentrically heating the bare optical fiber 10. When the highly reactive hydrocarbon such as the mixture of ethylene and carbon tetrachloride is used, the heating means is not necessarily used. Between the cooling jacket 44 and the reaction tube 45, a cooling gas such as helium or nitrogen is circulated to prevent temperature rise of the reaction tube 45. The reaction tube 45 has branch tubes 46 and 47 in the lower part and branch tubes 48 and 49 in the upper part. From the branch tubes 46 and and 48, a sealing gas such as nitrogen is introduced. In the reaction tube 45, the raw material gas is supplied through the branch tube 47, and the reacted gas is exhausted from the branch tube 48. To effectively separate the atmosphere in the reaction tube 45 from the ambient air, the reaction tube 45 has three baffle plates 110, 111 and 112 each having a center hole, which plates are tapered downwardly so that the bare optical fiber easily passes through the holes.

Since only the bare optical fiber is concentrically heated in the reaction furnace 56 and the wall of the reaction tube 45 is cooled from outside, the raw material is not pyrolyzed on the inner wall of the reaction tube, whereby the wall of the reaction tube 45 is not made opaque for a long time. The temperature of the heating furnace is adjusted as explained above, for example, at a temperature from 500° C. to 600° C. in case of acetylene or from 900° C. to 1000° C. in case of methane.

In this apparatus of FIG. 4, L is a distance between the neck-down part 53 and the plate 111. The conditions of the apparatus are adjusted so that the distance L and the drawing rate v of the optical fiber satisfy the above condition (I).

By using the apparatus of FIG. 4, a preform was melt and drawn to produce a bare optical fiber. Then, a pyrolytic carbon was coated on the bare optical fiber and then a resin coating was formed on the pyrolytic carbon coating to produce a coated optical fiber. R, L and v were adjusted as shown in Table 1 so as to satisfy the above condition (I). For comparison, the pyrolytic carbon was coated on the bare optical fiber under the conditions which did not satisfy the above condition (I).

The temperature in the reaction chamber was kept at 550° C. From each of the branch tubes 46 and 49, nitrogen gas as the sealing gas was introduced at a flow rate of 2 liter/min., and from the branch tube 47, the raw material gas, $C_2H_2$ was supplied at a flow rate of 500 ml/min. Further, from the branch tube 48, the reacted gas was exhausted at a flow rate of 2 liter/min. The bare optical fiber had a diameter of 125 or 150 $\mu$m, and the pyrolytic carbon coating had a thickness of 50 to 100 nm.

Figure 5:
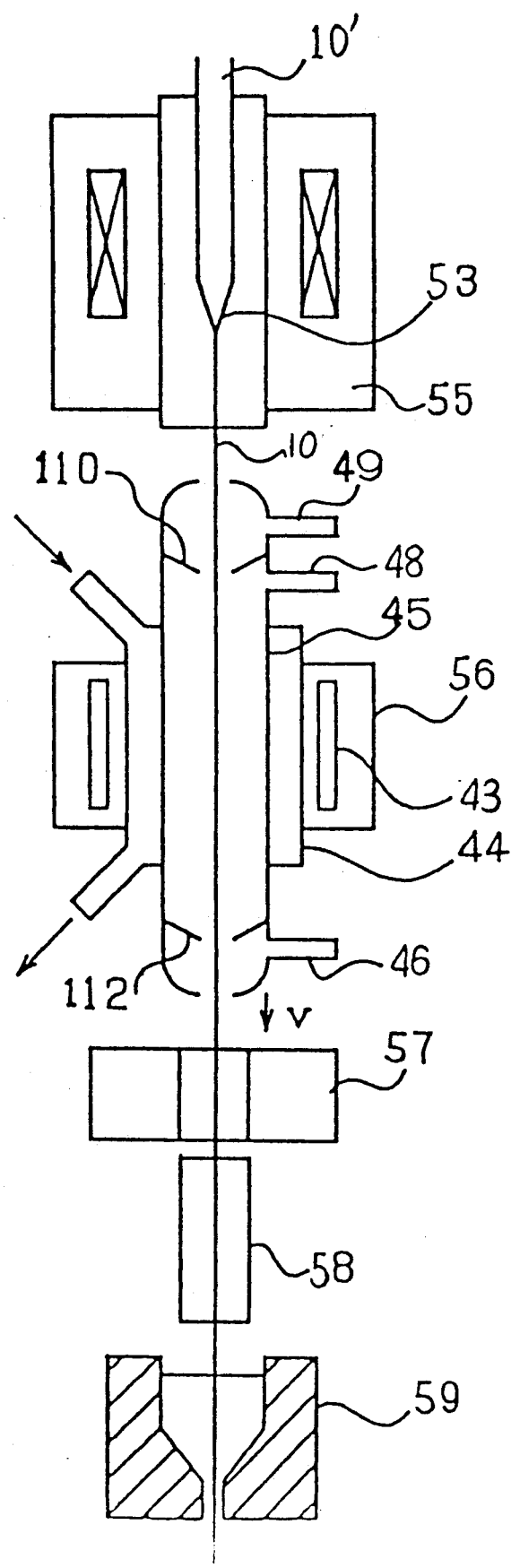

FIG. 5 shows a preferred embodiment of the apparatus for carrying out the process of the present invention. The construction of this apparatus is substantially the same as that of FIG. 4 except that this apparatus does not have the branch tube 47 and the baffle plate 111.

By using the apparatus of FIG. 5, a preform was melt and drawn to produce a bare optical fiber. Then, a pyrolytic carbon was coated on the bare optical fiber and then a resin coating was formed on the pyrolytic carbon coating to produce a coated optical fiber. The temperature in the reaction chamber was kept at 550° C. as in case of the apparatus of FIG. 4. From the branch tube 49, nitrogen gas as the sealing gas was introduced at a flow rate of 2 liter/min., and from the branch tube 48, the raw material gas, $C_2H_2$ was supplied at a flow rate of 500 ml/min. Further, from the branch tube 46, the reacted gas was exhausted at a flow rate of 2 liter/min. In this apparatus, the sealing gas and the raw material gas flowed downwardly in the reaction chamber in the same direction as the optical fiber proceeded. In addition, the cooling gas around the reaction chamber 45 was downwardly flown. Other conditions were the same as in the run No. 5 in the production experiments with using the apparatus of FIG. 4.

In all the above production experiments, the optical fiber coated with the pyrolytic carbon was cooled in the cooling device 58 and then coated with the resin in the die 59.

The cooling device 58 had a length of 30 cm and an inner diameter of 1.5 cm. Through its inner opening, helium gas as a cooling gas was supplied at a flow rate of 10 liter/min. to cool the carbon coated optical fiber to a temperature of 70° C. or lower. In case of forced cooling of the carbon coated optical fiber, even when the distance between the reaction chamber 56 and the die 59 is one meter, the resin can be coated on the carbon coating without hardening of the resin in the die 59.

The conditions and the results in the above experiments are summarized in the following Table 1.

TABLE 1

| Run No. | Process conditions | | | | Results | | |
|---|---|---|---|---|---|---|---|
| | R (μm) | L (cm) | v (m/min.) | Rxv/L (m/min.) | Resistivity ($10^{-3}$ ohm.cm) | $\Delta\alpha_{1.24}$ (dB/km) | Initial strength (kg) |
| 1 | 125 | 40 | 150 | 0.047 | 2.0 | 0 | 5.0 |
| 2 | ↑ | ↑ | 120 | 0.031 | 2.5 | 5 | 5.5 |
| 3 | ↑ | ↑ | 80 | 0.025 | (Film being hardly formed.) | | |
| 4 | ↑ | 60 | 120 | 0.027 | ↑ | | |
| 5 | ↑ | 30 | ↑ | 0.063 | 1.8 | 0 | 4.8 |
| 6 | ↑ | ↑ | 100 | 0.042 | 2.5 | 0.2 | 5.2 |
| 7 | 150 | 40 | 150 | 0.056 | 2.0 | 0 | 4.9 |
| 8 | ↑ | ↑ | 80 | 0.030 | 30 | 5 | 5.5 |
| 9 | ↑ | 60 | 120 | 0.030 | 28 | 5.5 | 5.4 |
| 10 | ↑ | ↑ | 100 | 0.025 | (Film being hardly formed.) | | |
| 11 | ↑ | 30 | 180 | 0.090 | 1.2 | 0 | 2.0 |
| 12 | ↑ | ↑ | 150 | 0.075 | 1.5 | 0 | 4.5 |
| 13 | ↑ | ↑ | 100 | 0.050 | 2.0 | 0 | 5.0 |
| 14*[1] | 125 | ↑ | 120 | 0.063 | 2.0 | 0 | 5.0 |

Note:
*[1] This run was done with the apparatus of FIG. 5.

The characteristics of the carbon coated optical fiber such as resistivity, permeability of hydrogen ($\Delta\alpha_{1.24}$) and initial strength depend on the value of R×v/L.

When this value is not larger than 0.030 m/min., no pyrolytic carbon coating is formed on the surface of the optical fiber.

When the value of R×v/L is larger than 0.030 m/min. and not larger than 0.035 m/min., the formed pyrolytic carbon coating has high resistivity and comparatively large hydrogen transmission.

When the value of R×v/L is larger than 0.035 m/min. and not larger than 0.075 m/min., the formed pyrolytic carbon coating has little or no hydrogen transmission and good initial strength.

When the value of R×v/L is larger than 0.080 m/min., the optical fiber has considerably decreased initial strength.

When the raw material gas is flowed in the same direction as the optical fiber proceeds, the initial strength are further increased.

Figure 6:
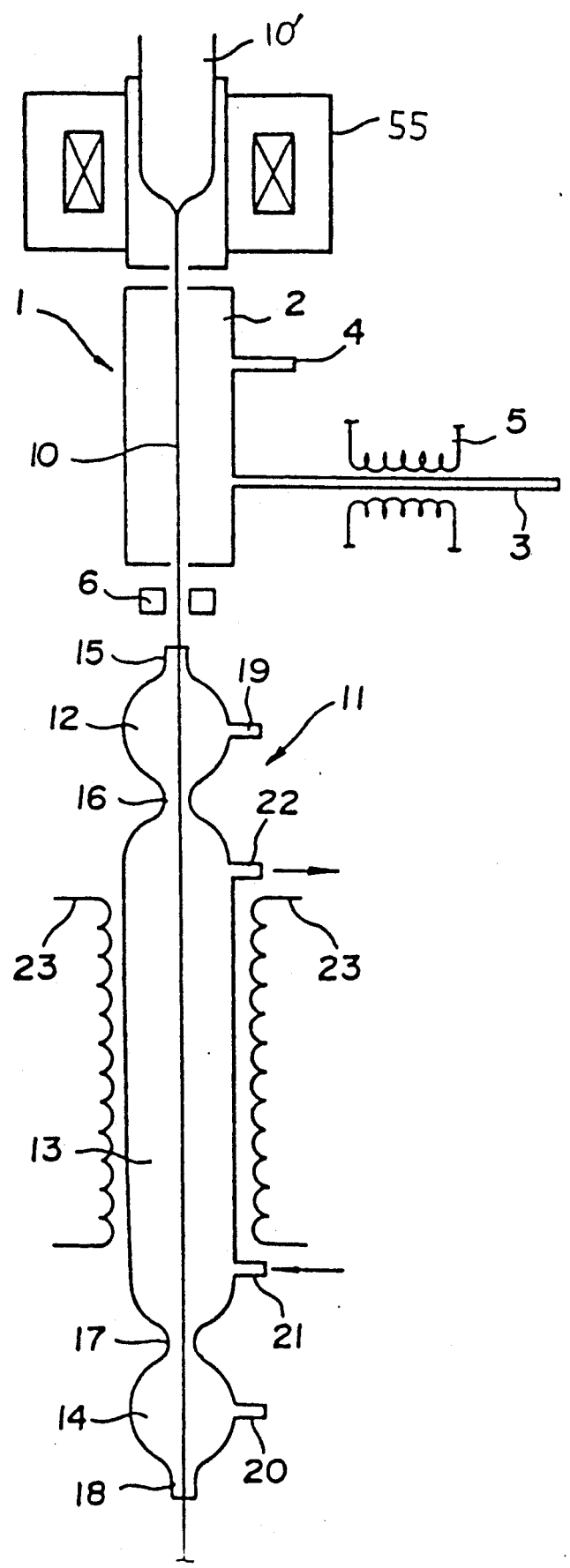
Figure 7:
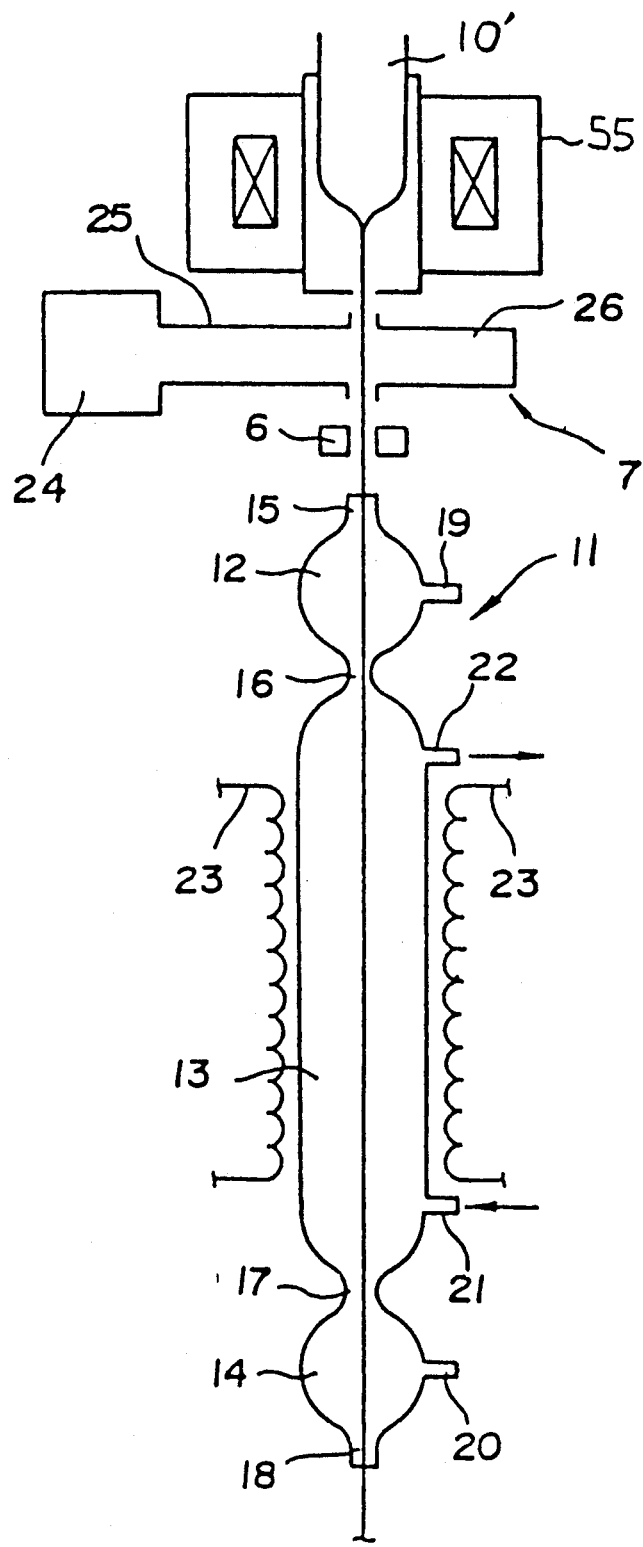

The apparatus of the present invention for coating the optical fiber will be illustrated by making reference to FIGS. 6 and 7. In these Figures, the reaction apparatus for coating the optical fiber with the pyrolytic carbon is the same as the conventional one shown in FIG. 1.

The apparatus of FIG. 6 comprises a temperature adjusting apparatus 1 above the apparatus 11 for coating the optical fiber which comprises the first isolation chamber 12, the reaction chamber 13 and the second isolation chamber 14.

The temperature adjusting apparatus 1 comprises a temperature adjusting chamber 2 through which the optical fiber 10 is passed, and the chamber 2 has an inlet tube 3 for introducing an inert gas such as helium and an outlet tube 4 for exhausting the inert gas. Around the inlet tube 3, provided is a heating and cooling means 5 for adjusting the temperature of gas to be introduced in the chamber 2 through the inlet tube 3. Between the temperature adjusting apparatus 1 and the reaction apparatus 11, there is a temperature sensor 6 for measuring a temperature of the optical fiber 10. Through feed back of the measured temperature by the sensor 6 to the heating and cooling means 5, the temperature of the optical fiber 10 to be introduced in the reaction apparatus 11 is precisely controlled.

In the coating apparatus of FIG. 6, after adjusting the temperature with the temperature adjusting apparatus 1, the bare optical fiber 10 drawn from the preform 10' is introduced in the reaction apparatus 11 and coated with the pyrolytic carbon by the CVD method.

As the temperature adjusting means, in addition to the apparatus as described above, other temperature adjusting means such as one utilizing radiation heat may be used.

When the temperature of the optical fiber is adjusted with the inert gas, the optical fiber can be effectively heated or cooled. Then, even if the lineal speed of the optical fiber is increased, the temperature of the optical fiber introduced in the reaction apparatus can be kept constant. In this case, when the inert gas is contacted with the optical fiber under pressure, for example, pressure of 1 to 10 atm., conduction of heat is improved so that the lineal speed of the optical fiber can be further increased, and/or the volume of the temperature adjusting chamber 2 can be made small. In addition, since the temperature of the optical fiber is controlled by feeding back the temperature measured by the temperature sensor 6 to the temperature adjusting apparatus, the temperature of the optical fiber introduced in the reaction apparatus is more precisely adjusted.

By using the apparatus of FIG. 6, the coated optical fiber was produced.

The preform 10' which consisted of a pure quartz core having a diameter of 2 mm and a cladding made of quartz containing 1.2% by weight of fluorine and had an outer diameter of 30 mm was heated to 2000° C. in the furnace 55 and drawn at a drawing rate of 5 m/sec. to produce a bare optical fiber 10 having a diameter of 125 μm. When no temperature adjusting apparatus was installed, the temperature of the bare optical fiber 10 was 1200° C. just below the drawing furnace 55 and 300° C. at a distance of 1 m below the drawing furnace. In the experiment of the present invention, just below the drawing furnace 55, the temperature adjusting apparatus 1 comprising the temperature adjusting chamber 2 having an inner diameter of 20 mm and a length of 80 cm was installed, and helium gas heated at 900° C. was introduced in the temperature adjusting chamber 2 from the inlet tube 3. The temperature of the optical fiber just after exiting the temperature adjusting chamber 2 was 900° C.

Just below the temperature adjusting apparatus 1, the CVD reaction apparatus 11 comprising the reaction chamber 13 having an inner diameter of 20 mm and a length of 50 cm was installed. In the reaction chamber 13, highly pure (purity of higher than 99.999%) of methane gas and highly pure hydrogen gas were introduced at flow rates of 2000 ml/min. and 500 ml/min., respectively while keeping the temperature of the reaction chamber at 700° C. On the optical fiber which exited the reaction apparatus, amorphous carbon was coated at a thickness of 100 nm, and its temperature was 650° C. Subsequently, the carbon coated optical fiber was coated with an organic resin to produce a coated optical fiber.

The initial tensile strength of the coated optical fiber was 700 Kpsi, which is much larger than that of the conventional coated optical fiber.

The light transmission loss at a wavelength of 1.24 μm was very small and only 0.36 dB/km. This means that there was little transmission loss due to hydrogen molecules.

After keeping the coated optical fiber produced by the apparatus of FIG. 6 in a pure hydrogen atmosphere for 100 hours, the light transmission loss at the wavelength of 1.24 μm was 0.36 dB/km. This means that there is no absorption of the hydrogen molecules by the coated optical fiber.

FIG. 7 shows another embodiment of the coating apparatus of the present invention which comprises a temperature adjusting apparatus 7 which utilize microwaves for heating the bare optical fiber 10. That is, the apparatus 7 of FIG. 7 has a microwave generator 24. With the generator 24, a waveguide 25 for guiding the generated microwave to the optical fiber 10 is connected as close to the reaction apparatus 13 as possible, and a resonator 26 for resonating the microwave guided through the waveguide 25 to increase the heating efficiency is positioned so as to sandwich the optical fiber 10 between the waveguide 25 and the resonator 26.

The bare optical fiber 10 exits the drawing furnace 55 and spontaneously cooled and reaches the temperature adjusting apparatus 7. In the apparatus 7, the optical fiber is heated at a temperature suitable for coating in the reaction chamber 13 with the microwaves, which are generated by the microwave generator 24 and guided to the optical fiber 10 through the waveguide 25 and the resonator 26. The temperature of the optical fiber 10 is controlled in the same manner as in the apparatus of FIG. 6.

By using the apparatus of FIG. 7, the coated optical fiber was produced.

The preform 10' which consisted of a pure quartz core having a diameter of about 2 mm and a cladding made of quartz containing 1.2% by weight of fluorine and had an outer diameter of 25 mm was heated to 2000° C. in the furnace 55 and drawn at a drawing rate of 3.5 m/sec. to produce a bare optical fiber 10 having a diameter of 125 μm. The optical fiber was heated with the temperature adjusting apparatus 7 so as to keep the temperature of optical fiber just before introducing in the reaction chamber 13 at 1100° C. Then, the optical fiber was introduced in the reaction chamber 13 having an inner diameter of 20 mm and a length of 40 cm. While heating the reaction chamber at 500° C., acetylene was introduced in the reaction chamber at a flow rate of 500 ml/min. to from an amorphous carbon coating having a thickness of 60 nm on the optical fiber. Further, around the carbon coating, an organic resin was coated to produce a coated optical fiber.

The initial tensile strength of the coated optical fiber was 700 Kpsi, which is much larger than that of the optical fiber coated with the same coatings by the conventional method.

The light transmission loss at a wavelength of 1.24 μm was very small and only 0.36 dB/km. This means little transmission loss due to hydrogen molecules was present.

After keeping the coated optical fiber produced by the apparatus of FIG. 7 in a pure hydrogen atmosphere for 100 hours, the light transmission loss at the wavelength of 1.24 μm was 0.36 dB/km. This means that there is no absorption of the hydrogen molecules by the coated optical fiber.

Figure 8:
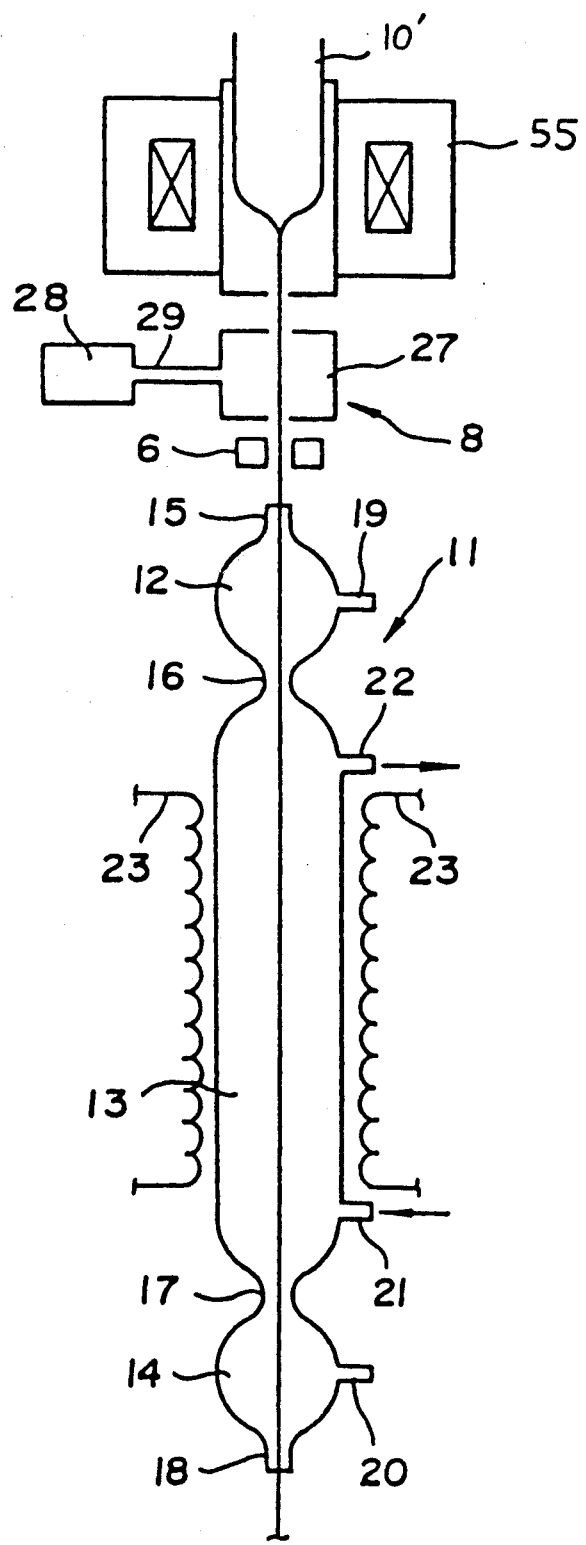
Figure 9A:
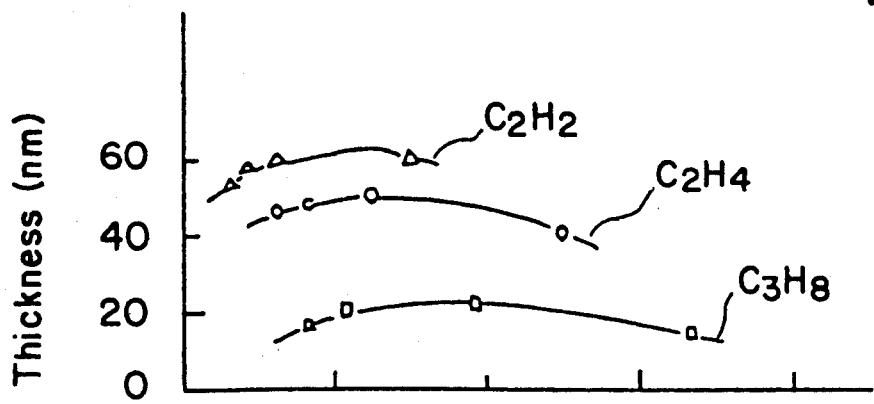
Figure 9B:
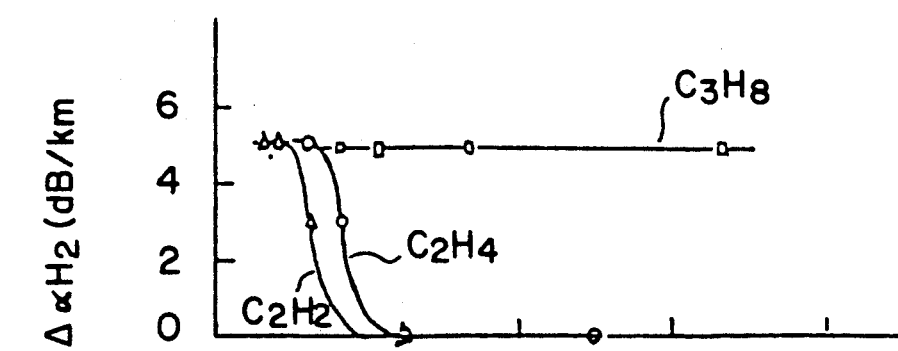
Figure 9C:
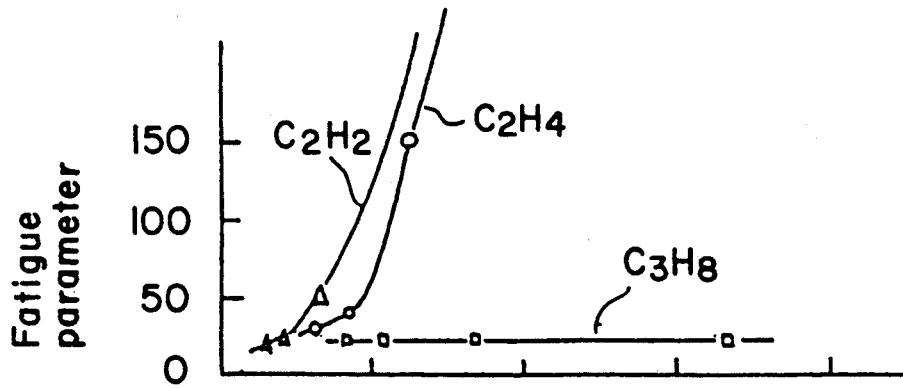
Figure 9D:
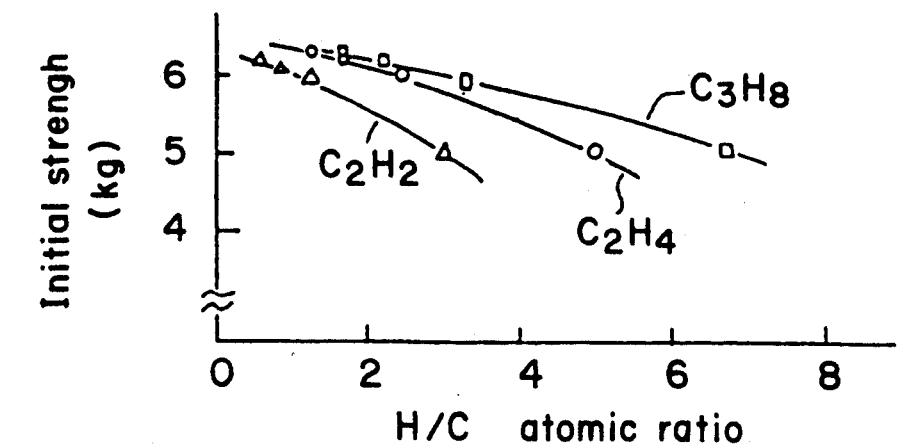

FIG. 8 shows a further embodiment of the coating apparatus of the present invention which comprises a temperature adjusting apparatus 8 which utilize a laser beam for heating the bare optical fiber 10. That is, the apparatus 8 of FIG. 8 has a heating camber 27, which is positioned as close to the reaction chamber 13 as possible. With the heating chamber 27, a laser generator 24 is connected optionally through a conduit 29.

The bare optical fiber 10 exits the drawing furnace 55 and spontaneously cooled and reaches the temperature adjusting apparatus 8. In the apparatus 8, the optical fiber is heated at a temperature suitable for coating in the reaction apparatus 13 with the laser beam, which is generated by the laser generator 28. The temperature of the optical fiber 10 is controlled in the same manner as in the apparatus of FIG. 6.

In the above embodiments, the temperature adjusting apparatus 1, 7 or 8 is separated from the first isolation chamber 12, although the temperature adjusting apparatus can be integrated with the fist chamber, whereby the heating of the optical fiber and the sealing of the reaction chamber with the inert gas can be effected by the same part. In such construction, the temperature sensor 6 is positioned in the opening 16. Alternatively, the temperature sensor may not be used, when output of the heating and cooling apparatus 5, the microwave generator 24 or the laser generator 28, and/or the installation of the apparatus 1, 7 or 8 of FIG. 6, 7 or 8 are suitably adjusted.

The present invention will be illustrated further in detail by following Examples.

EXAMPLE 1

As the hydrocarbon, $C_3H_8$, $C_2H_4$ or $C_2H_2$ was used together with carbon tetrachloride to form a pyrolytic carbon which was coated on a bare optical fiber, and the characteristics of the carbon coated fiber were measured.

In this example, the distance L from the neck-down part of the glass preform to the reaction chamber was 300 mm, the drawing rate was 150 m/min., and the estimated temperature of the bare optical fiber in the reaction chamber was 1020° C.

The reaction conditions are summarized in Table 2.

Carbon tetrachloride was supplied by using helium as a carrier gas. The content of carbon tetrachloride was about 15% by volume calculated from the saturated vapor L. pressure of carbon tetrachloride at 25° C.

The hydrogen resistance is expressed in terms of "$\Delta\alpha H_2$" *which is an increase of light absorption at a wavelength length of* 1.24 μm after keeping the optical fiber at 100° C. in an atmosphere of hydrogen of 1 atm for one day.

The fatigue parameter (n) is calculated as

20 Optical fibers are subjected to a tensile test at a rate of strain of 100%/min. or 1%/min., and the 50% values of strength at break at each rate of strain ($T_{100}$ and $T_1$) were calculated. From the 50% value of strength at break, the fatigue parameter (n) is calculated according to the following equation:

$$n = \frac{\log(\text{rate of strain at } 100\%/\text{min.}) - \log(\text{rate of strain at } 1\%/\text{min.})}{T_{100} - T_1}$$

The initial strength is expressed in terms of a 50% value of strength at break in a tensile test for 20 optical fibers at a rate of strain of 100%/min.

TABLE 2

| Run No. | Hydrocarbon Compound | Flow rate (ml/min.) | Flow rate of helium (ml/min.) | Actual flow rate of CCl$_4$ (ml/min.) | Atomic ratio of H/Cl | $\Delta\alpha_{H2}$ (dB/km) | Fatigue parameter (n) | Initial strength (kg) |
|---|---|---|---|---|---|---|---|---|
| 1 | C$_3$H$_8$ | 100 | 200 | 30 | 6.7 | 4.8 | 27 | 5.0 |
| 2 | ↑ | ↑ | 400 | 60 | 3.3 | 4.9 | 25 | 5.9 |
| 3 | ↑ | ↑ | 600 | 90 | 2.2 | 5.0 | 25 | 6.2 |
| 4 | ↑ | ↑ | 800 | 120 | 1.67 | 5.0 | 23 | 6.3 |
| 5 | C$_2$H$_4$ | 150 | 200 | 30 | 5 | 0 | >150 | 5.0 |
| 6 | ↑ | ↑ | 400 | 60 | 2.5 | 0 | 150 | 6.0 |
| 7 | ↑ | ↑ | 600 | 90 | 1.67 | 3.0 | 40 | 6.1 |
| 8 | ↑ | ↑ | 800 | 120 | 1.25 | 5.0 | 30 | 6.2 |
| 9 | C$_2$H$_2$ | 150 | 200 | 30 | 2.5 | 0 | >150 | 5.0 |
| 10 | ↑ | ↑ | 400 | 60 | 1.25 | 3.0 | 50 | 5.9 |
| 11 | ↑ | ↑ | 600 | 90 | 0.83 | 5.0 | 25 | 6.0 |
| 12 | ↑ | ↑ | 800 | 120 | 0.625 | 5.0 | 23 | 6.1 |

The above results are plotted in FIG. 9 against the H/Cl atomic ratio.

EXAMPLE 2

To study the relationship between the temperature of optical fiber to be coated with carbon and the initial strength of the coated optical fiber, the following experiments were carried out:

As the hydrocarbon, ethylene was supplied at an actual flow rate of 150 ml/min., and as the halogen source, carbon tetrachloride was supplied at an actual flow rate of 60 ml/min. Other conditions are summarized in Table 3.

Under the above conditions, the carbon coating was formed around the optical fiber.

The results are shown in Table 3.

TABLE 3

| Run No. | Distance L (cm) | Linear velocity of fiber | Estimated temp. of fiber | $\Delta\alpha_{H2}$ (dB/km) | Fatigue parameter (n) | Initial strength (kg) |
|---|---|---|---|---|---|---|
| 1 | 20 | 140 | 1240 | 0 | >150 | 5.3 |
| 2 | 20 | 180 | 1380 | 0 | ↑ | 4.0 |
| 3 | 20 | 220 | 1470 | 5 | 30 | 3.6 |
| 4 | 30 | 140 | 970 | 0 | >150 | 6.0 |
| 5 | 30 | 180 | 1140 | 0 | ↑ | 5.6 |
| 6 | 30 | 220 | 1260 | 5 | 30 | 5.3 |
| 7 | 40 | 140 | 770 | 5 | 25 | 6.0 |
| 8 | 40 | 180 | 950 | 0 | >150 | 6.0 |
| 9 | 40 | 220 | 1080 | 5 | 30 | 5.7 |

EXAMPLE 3

Under the conditions shown in Table 4, a bare optical fiber was coated with carbon. The temperature of the bare optical fiber in the reaction chamber was adjusted by controlling the linear velocity of the fiber. When the linear velocity was 150 m/min., the temperature was about 1200° C., and when the linear velocity was 120 m/min., the temperature was about 900° C. In Run No. 1, now carrier gas was used, while in Run Nos. 2 through 5, helium gas kept at 40° C. was supplied as the carrier gas through a bubbler at a flow rate specified in Table 4.

The results are shown in Table 4.

TABLE 4

| Run No. | Raw material(s) (ml/min.) | Flow rate of carrier (ml/min.) | H/halogen atomic ratio | Temp. of reaction chamber | Linear velocity of fiber | Initial strength | Fatigue parameter | $\Delta\alpha_{H2}$ (dB/km) |
|---|---|---|---|---|---|---|---|---|
| 1 | CF$_4$ (500) C$_3$H$_8$ (100) | — — | 0.4 | 400 | 120 | 5.7–6.0 | ca. 120 | 0 |
| 2 | CHCl$_3$ (490) | 560 | 0.33 | 400 | 120 | 5.5–5.8 | ca. 120 | 0 |
| 3 | CCl$_4$ (140) C$_3$H$_8$ (100) | 560 — | 1.4 | 400 | 120 | 5.8–6.1 | ca. 200 | 0 |
| 4 | CCl$_4$ (140) C$_3$H$_8$ (100) | 560 — | 1.4 | 400 | 150 | 4.3–4.5 | ca. 200 | 0 |
| 5 | CCl$_4$ (140) C$_3$H$_8$ (100) | 560 — | 1.4 | 200 | 150 | 5.5–5.8 | ca. 180 | 2.1 |
| 6 | CCl$_4$ (80) C$_2$H$_4$ (40) | 320 — | 0.5 | 100 | 120 | 5.7–6.1 | ≧100 | 0 |
| 7 | CCl$_4$ (560) C$_6$H$_6$ (100) | 2240 320 | 1.1 | 400 | 120 | 5.5–5.8 | ≧100 | 0 |
| 8 | CCl$_4$ (100) C$_3$H$_8$ (200) | 400 — | 4.0 | 200 | 120 | 4.3–4.5 | ≧100 | 0 |
| 9 | None | | | | 150 | 5.8–6.3 | ca. 21 | 5.5 |
| 10 | C$_2$H$_2$ (200) | — | | 550 | 150 | 4.0–4.3 | ca. 180 | 0 |

What is claimed is:

1. An SiO$_2$ based glass optical fiber, a peripheral surface of which is coated with a carbon layer wherein a carbon atom in the carbon layer and the silicon oxide of the optical fiber are not chemically bonded with one another.

2. The optical fiber according to claim 1, wherein the carbon layer has a resistivity of not larger than $8 \times 10^{-3}$ ohm.cm.

* * * * *

UNITED STATES PATENT AND TRADEMARK OFFICE
CERTIFICATE OF CORRECTION

PATENT NO. : 5,035,484

DATED : July 30, 1991

INVENTOR(S) : Ishiguro et al

It is certified that error appears in the above-identified patent and that said Letters Patent is hereby corrected as shown below:

ON THE TITLE PAGE

Please change:

(30) Foreign Application Priority Data

"Japan 64-173327" to --Japan 1-173327--

"Japan 293026" to --Japan 1-293026--.

Signed and Sealed this

Second Day of February, 1993

Attest:

STEPHEN G. KUNIN

Attesting Officer    Acting Commissioner of Patents and Trademarks